US011218856B2

(12) United States Patent
Weksler et al.

(10) Patent No.: US 11,218,856 B2
(45) Date of Patent: Jan. 4, 2022

(54) DATA SHARING WITH MULTIPLE BLUETOOTH DEVICES

(71) Applicant: Lenovo (Singapore) Pte. Ltd., Singapore (SG)

(72) Inventors: Arnold S. Weksler, Raleigh, NC (US); John C. Mese, Cary, NC (US); Nathan J. Peterson, Oxford, NC (US); Russell Speight VanBlon, Raleigh, NC (US); Mark Patrick Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/692,309

(22) Filed: Nov. 22, 2019

(65) Prior Publication Data

US 2021/0160671 A1 May 27, 2021

(51) Int. Cl.
| | | |
|---|---|---|
| *H04B 7/00* | (2006.01) | |
| *H04W 4/80* | (2018.01) | |
| *H04W 4/48* | (2018.01) | |
| *H04W 76/14* | (2018.01) | |
| *H04W 76/15* | (2018.01) | |
| *G06F 16/44* | (2019.01) | |
| *H04L 29/12* | (2006.01) | |
| *G10L 17/06* | (2013.01) | |
| *G06F 16/48* | (2019.01) | |
| *H04L 29/08* | (2006.01) | |
| *G10L 17/00* | (2013.01) | |

(52) U.S. Cl.
CPC .............. *H04W 4/80* (2018.02); *G06F 16/44* (2019.01); *G06F 16/48* (2019.01); *G10L 17/00* (2013.01); *G10L 17/06* (2013.01); *H04L 61/1576* (2013.01); *H04L 67/327* (2013.01); *H04W 4/48* (2018.02); *H04W 76/14* (2018.02); *H04W 76/15* (2018.02)

(58) Field of Classification Search
CPC ......... G10L 17/06; G10L 17/00; G06F 16/44; G06F 16/48; H04W 4/48; H04W 4/80; H04W 76/10; H04W 76/15; H04L 61/1576; H04L 67/327
See application file for complete search history.

(56) References Cited

U.S. PATENT DOCUMENTS 10,198,877 B1 * 2/2019 Maltsev ................. B60K 35/00
2018/0061421 A1 * 3/2018 Sarikaya ............. G10L 15/1815

* cited by examiner

*Primary Examiner* — Nhan T Le
(74) *Attorney, Agent, or Firm* — VanLeeuwen & VanLeeuwen; Zhouxing Wu

(57) ABSTRACT

An approach is provided that connects an information handling system, such as a media console included in an automobile, to a number of devices using Bluetooth connections. The approach connects the information handling system to the devices. Each of the devices is associated with a user and there may be multiple users with each user having one or more of the devices. A request is received from one of the users and a device is identified that is associated with the user from whom the request was received. The request is then fulfilled by utilizing one of the devices.

17 Claims, 8 Drawing Sheets

DATA SHARING WITH MULTIPLE BLUETOOTH DEVICES

BACKGROUND

When multiple people are riding in an automobile with Bluetooth functionality, traditional automobile media systems make a Bluetooth connection with one of the devices, such as the primary driver of the automobile. If media or other content is on a different device, traditional systems require the first user to disconnect his or her Bluetooth device in order to connect to a different device. This disconnecting and reconnecting of devices is troublesome and, in some cases, may even be dangerous if the driver becomes distracted when having to disconnect or reconnect a Bluetooth device to the automobile's media console.

SUMMARY

An approach is provided that connects an information handling system, such as a media console included in an automobile, to a number of devices using Bluetooth connections. The approach connects the information handling system to the devices. Each of the devices is associated with a user and there may be multiple users with each user having one or more of the devices. A request is received from one of the users and a device is identified that is associated with the user from whom the request was received. The request is then fulfilled by utilizing one of the devices.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The figures show an approach that utilizes multiple devices connected simultaneously to an automobile console. User contact information can be joined so that contacts can be accessed from other phones. In this manner voice commands can be given to call a contact from another phone. The intersection of all phone numbers can be displayed on the car console rather than simply displaying contacts for only one device. Applications can also be accessed from other phones or a list of common applications can be shown. In this fashion, maybe the navigation app exists on one phone but a different navigation app is available on another phone. A voice command can be used to load whatever navigation application requested regardless of which phone has it installed. Voice can also be used to discern which phone to load a contact, application, or content. For example if the auto console hears the driver's, it will load information contained on the driver's phone that it associates the driver's voice. Alternatively, it would load the information from another user if such other user's voice is detected. For ambiguous voice commands such as "call mom," the system could either call the listing for "mom" associated with the voice it detects or supply the user with a list of matching contacts for "mom" on the various devices and ask the user to select the desired contact.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
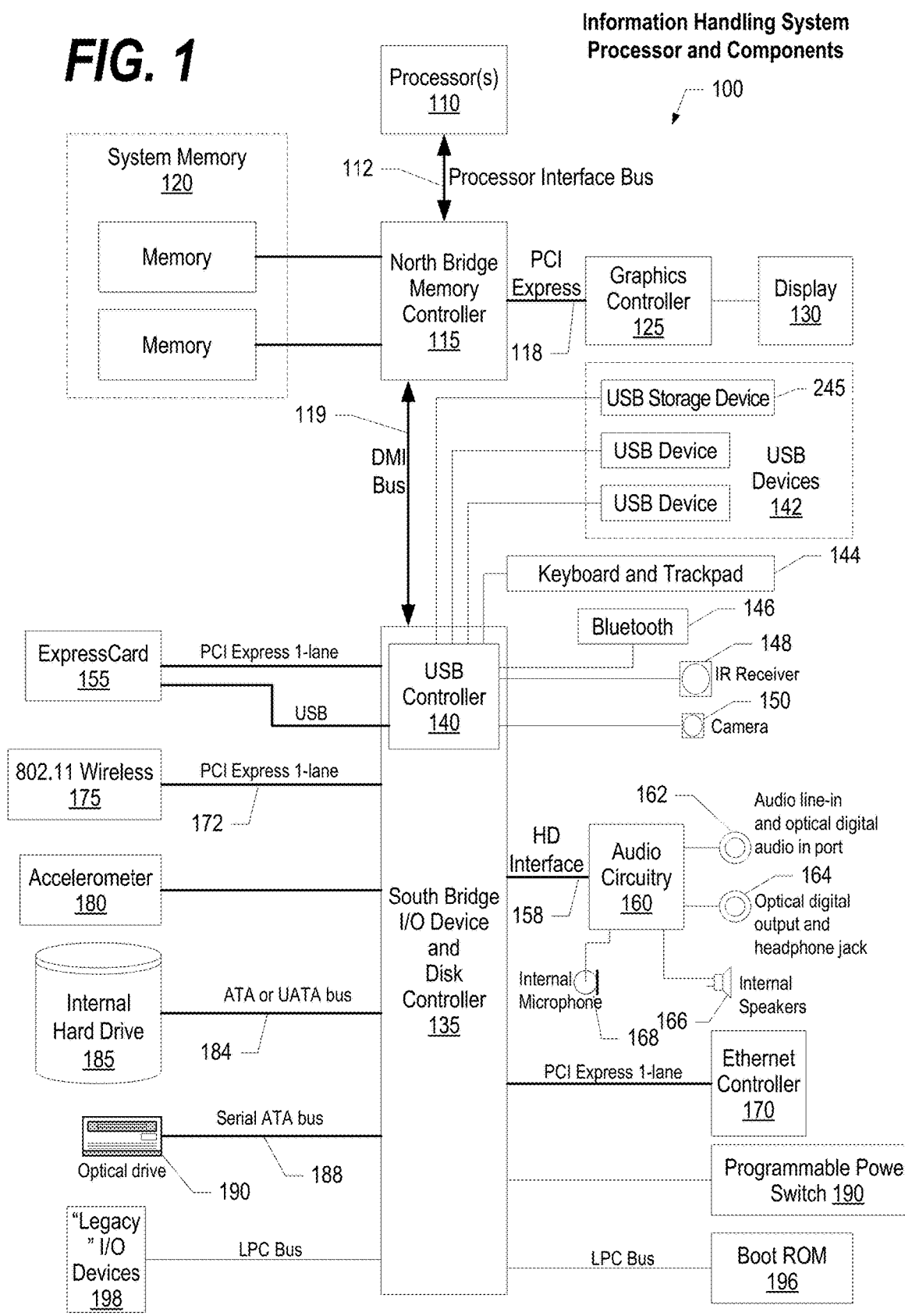
FIG. 1 is a block diagram of a data processing system in which the methods described herein can be implemented.
Figure 2:
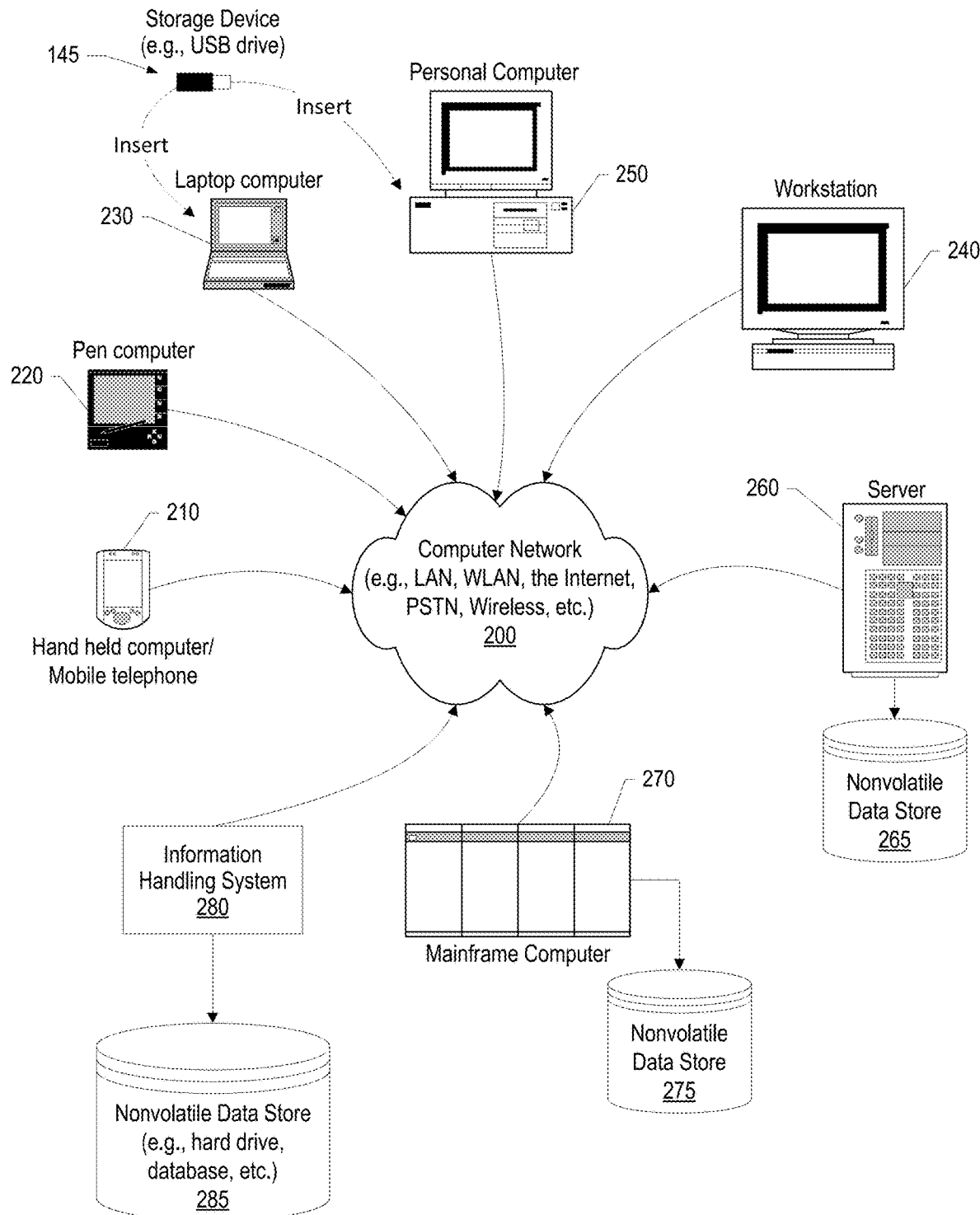
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
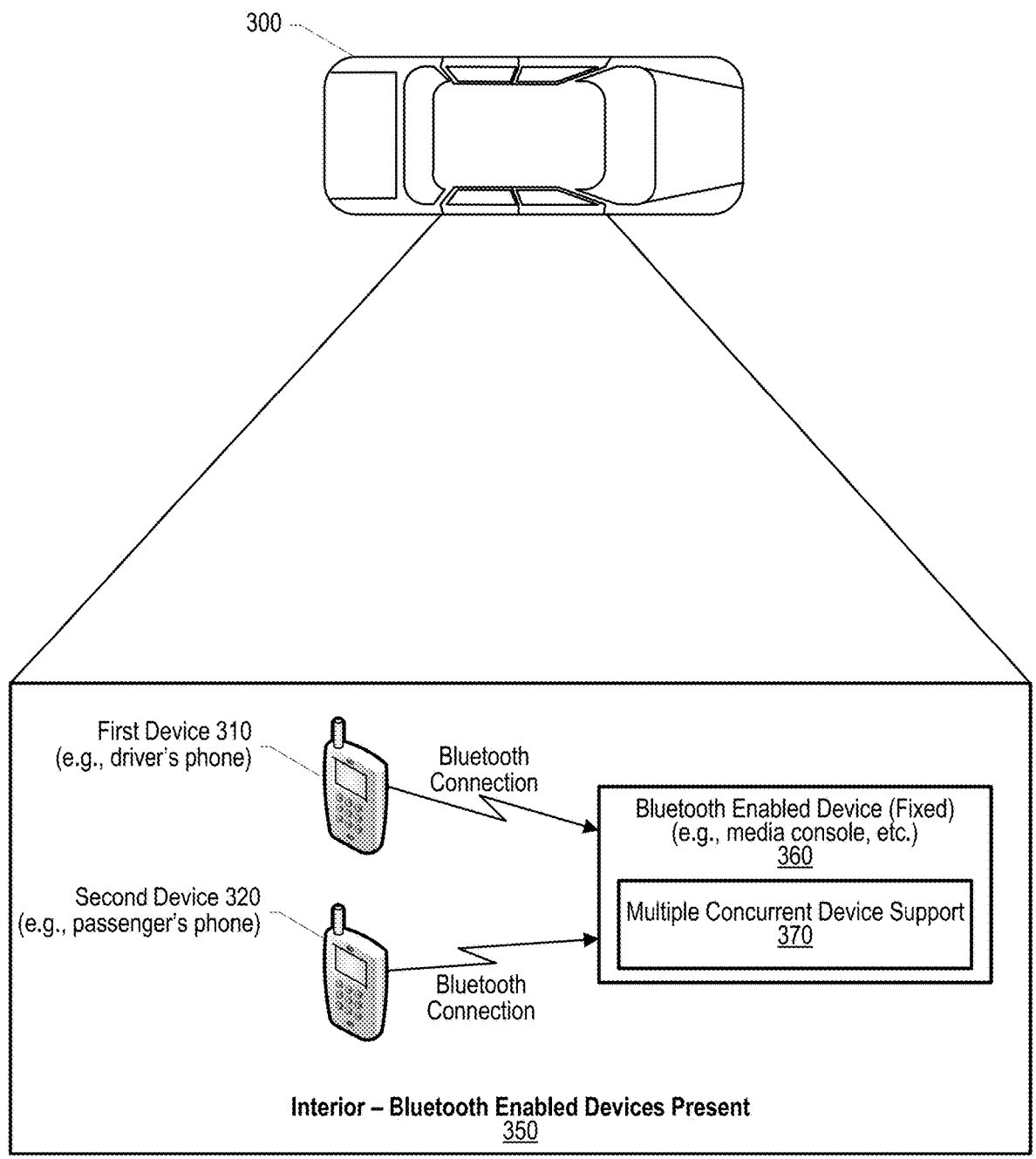
FIG. 3 is a component diagram depicting the components used in sharing data among multiple Bluetooth connected devices.

FIG. 3 is a component diagram depicting the components used in sharing data among multiple Bluetooth connected devices. Automobile 300 is shown with interior 350 depicting two devices (device 310 and device 320) both of which are connected to the automobile's information handling system 360 which is a Bluetooth enabled device, such as a media console, to which the devices (e.g., smart phones, etc.) are connected. Automobile Bluetooth enabled device 360 (e.g., media console, etc.) includes multiple concurrent device support functionality 370 that allow the multiple devices (310 and 320) to interface with the automobile's media console concurrently. The utilization of the multiple devices concurrently connected to the automobile's media console is further explained and described in further detail below.

Figure 4:
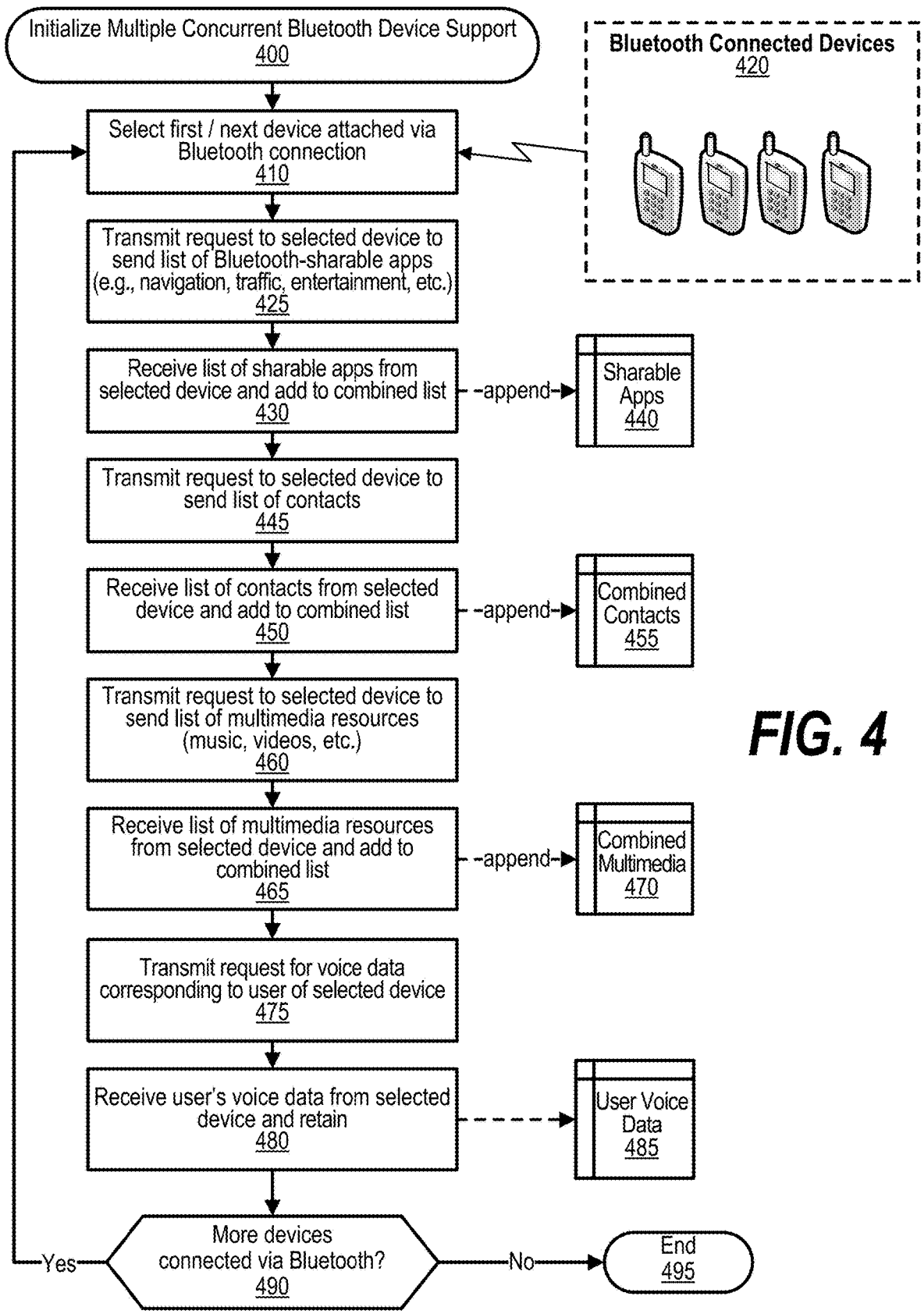
FIG. 4 is a flowchart showing steps taken by a process that initializes support for multiple concurrent Bluetooth connected devices.

FIG. 4 is a flowchart showing steps taken by a process that initializes support for multiple concurrent Bluetooth connected devices. FIG. 4 processing commences at 400 and shows the steps taken by a process that initializes use of multiple concurrent Bluetooth connected devices 420. At step 410, the process selects the first device attached via a Bluetooth connection, such as a smart phone connected to the automobile's media console.

At step 425, the process transmits a request to the selected device to have the device provide a list of Bluetooth-sharable apps available on the device. These apps might be navigation apps, traffic apps, entertainment apps, and the like. At step 430, the process receives the list of sharable apps from the selected device and adds the list of sharable apps to a combined list of sharable (available) apps that is stored in memory area 440.

At step 445, the process transmits a request to the selected device to provide a list of contacts, such as found in the device's telephone directory. At step 450, the process receives the list of contacts from the selected device and adds the received contacts to a combined list of contacts that is stored in memory area 455.

At step 460, the process transmits a request to the selected device to have the device provide a list of multimedia resources, such as music files, etc., that are available on the device. At step 465, the process receives the list of multimedia resources from the selected device and adds the received multimedia resources to a combined list that is stored in memory area 470.

At step 475, the process transmits request for voice data corresponding to a user of the selected device, such as might be stored in a voice memo file on the selected device. At step 480, the process receives the user's voice data from the selected device and retains the voice data in memory area 485. The voice data is used to discern between users when voice input is received at the system to determine which user is submitting a request to assist the system in determining which device to use or prioritize when fulfilling the request.

The process determines as to whether there are more devices connected to the system via Bluetooth connections (decision 490). If there are more devices connected to the system via Bluetooth connections, then decision 490 branches to the 'yes' branch which loops back to step 410 to select and process the next device as describe above. This looping continues until all of the devices have been processed, at which point decision 490 branches to the 'no' branch exiting the loop. FIG. 4 processing thereafter ends at 495.

Figure 5:
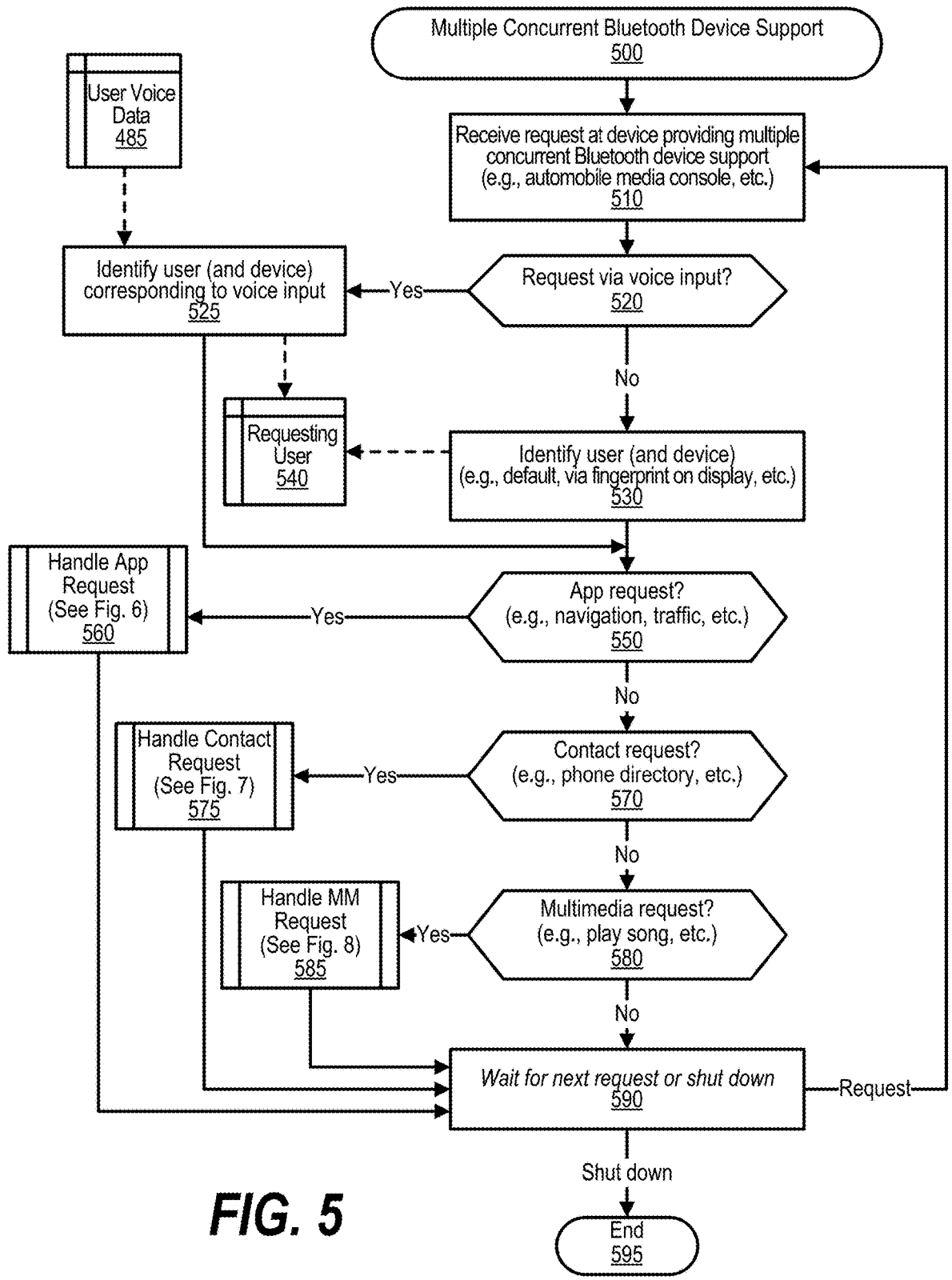
FIG. 5 is a flowchart showing steps taken by a process that shows handling of multiple concurrent Bluetooth connected devices.

FIG. 5 is a flowchart showing steps taken by a process that shows handling of multiple concurrent Bluetooth connected devices. FIG. 5 processing commences at 500 and shows the steps taken by a process that provides multiple concurrent Bluetooth device support, such as at a vehicle media console to which multiple smart phones are connected via Bluetooth connections as shown in FIG. 4. At step 510, the process receives a request at the device that is providing the multiple concurrent Bluetooth device support, such as at the automobile media console, etc.

The process determines whether the request is a voice input request (decision 520). If the request is a voice input request, then decision 520 branches to the 'yes' branch whereupon, at step 525 the process identifies the user (and associated device(s)) that correspond to the voice input using the voice samples that were received in FIG. 4. On the other hand, if the request is a not voice input request, then decision 520 branches to the 'no' branch whereupon, at step 530, the process identifies the user (and his/her device) either by selecting a default device, via biometric (e.g., fingerprint on display, etc.) or some other method.

The process determines as to whether the request is an app request (decision 550). If the request is an app request, then decision 550 branches to the 'yes' branch whereupon, at predefined process 560, the process performs the Handle App Request routine (see FIG. 6 and corresponding text for processing details). On the other hand, if the request is not an app request, then decision 550 branches to the 'no' branch for further processing.

The process determines as to whether the request is a contact (e.g., telephone) request (decision 570). If the request is a contact request, then decision 570 branches to the 'yes' branch whereupon, at predefined process 575, the process performs the Handle Contact Request routine (see FIG. 7 and corresponding text for processing details). On the other hand, if the request is not a contact request, then decision 570 branches to the 'no' branch for further processing.

The process determines as to whether the request is a multimedia request (decision 580). If the request is a multimedia request, then decision 580 branches to the 'yes' branch whereupon, at predefined process 585, the process performs the Handle Multimedia Request routine (see FIG. 8 and corresponding text for processing details). On the other hand, if the request is not a multimedia request, then decision 580 branches to the 'no' branch bypassing step predefined process 585.

At step 590, the process waits to receive the next request from one of the users or for the system to be shut down (e.g., automobile ignition and systems turned off, etc.). When the next request is received at the system, such as the automobile's multimedia console, then processing loops back to step 510 to handle the request as described above. This looping to handle requests continues until the system is shut down, at which point FIG. 5 processing ends at 595.

Figure 6:
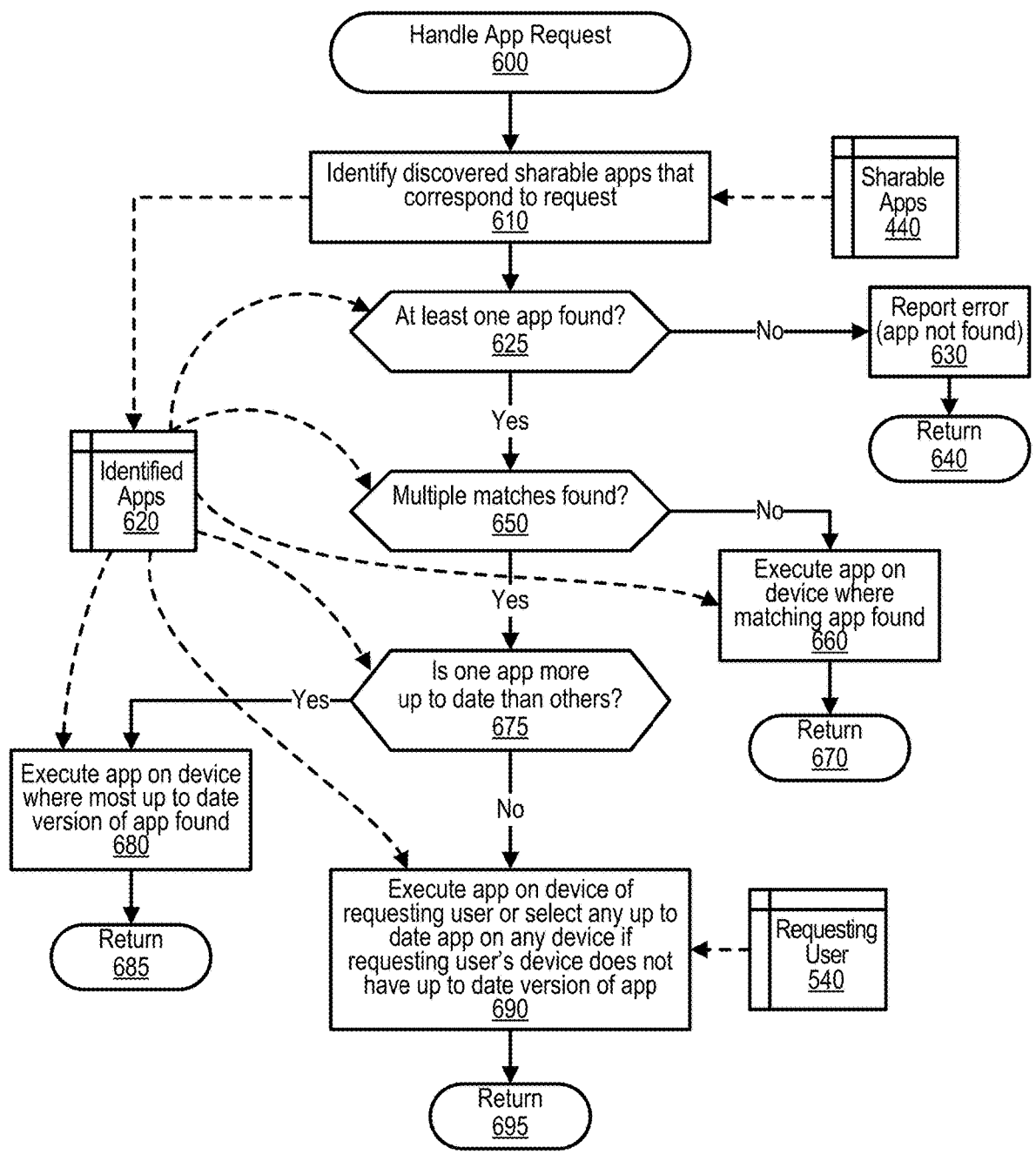
FIG. 6 is a flowchart showing steps taken by a process that shows the handling of an app request received at a console that is managing multiple concurrent Bluetooth connected devices.

FIG. 6 is a flowchart showing steps taken by a process that shows the handling of an app request received at a console that is managing multiple concurrent Bluetooth connected devices. FIG. 6 processing commences at 600 and shows the steps taken by a process that handles an app request that is received from one of the users (e.g., one of the passengers in a vehicle, etc.). At step 610, the process identifies the sharable apps that were discovered during FIG. 4 processing and with the identified apps corresponding to the received request. The sharable apps are retrieved from memory area 440 and compared to the criteria included in the received request.

The process determines whether at least one app was identified that matches the request (decision 625). If at least one app was identified that matches the request, then decision 625 branches to the 'yes' branch for further processing. On the other hand, if no matching apps were found, then decision 625 branches to the 'no' branch whereupon, at step 630 an error is reported to the users indicating that no matching apps were found, and processing returns to the calling routine (see FIG. 5) at 640.

The process next determines whether multiple matches were found matching the app request (decision 650). If multiple matches were found matching the app request, then decision 650 branches to the 'yes' branch to perform steps 675 through 695 used to identify the particular app that is executed. On the other hand, if only a single matching app is found, then decision 650 branches to the 'no' branch whereupon, at step 660, the process executes the app on the device where the matching app was found, and processing thereafter returns to the calling routine (see FIG. 5) at 670.

When more than one matching app is found on the connected devices, then steps 675 through 695 are performed to identify and execute one of the apps. First, the process determines whether one of the apps is more up to date than the other matching (decision 675). If is one app is more up to date than others, then decision 675 branches to the 'yes' branch whereupon, at step 680, the process executes the most up to date app on the device where the most up to date version of the app was found, and processing thereafter returns to the calling routine (see FIG. 5) at 685. On the other hand, if multiple up to date versions of the app are found, then decision 675 branches to the 'no' branch whereupon, at step 690, the process executes the app on the device of the requesting user (if that version of the app is up to date) or selects any up to date version of the app on any of the connected devices if the requesting user's device does not have an up to date version of app installed. FIG. 6 processing thereafter returns to the calling routine (see FIG. 5) at 695.

Figure 7:
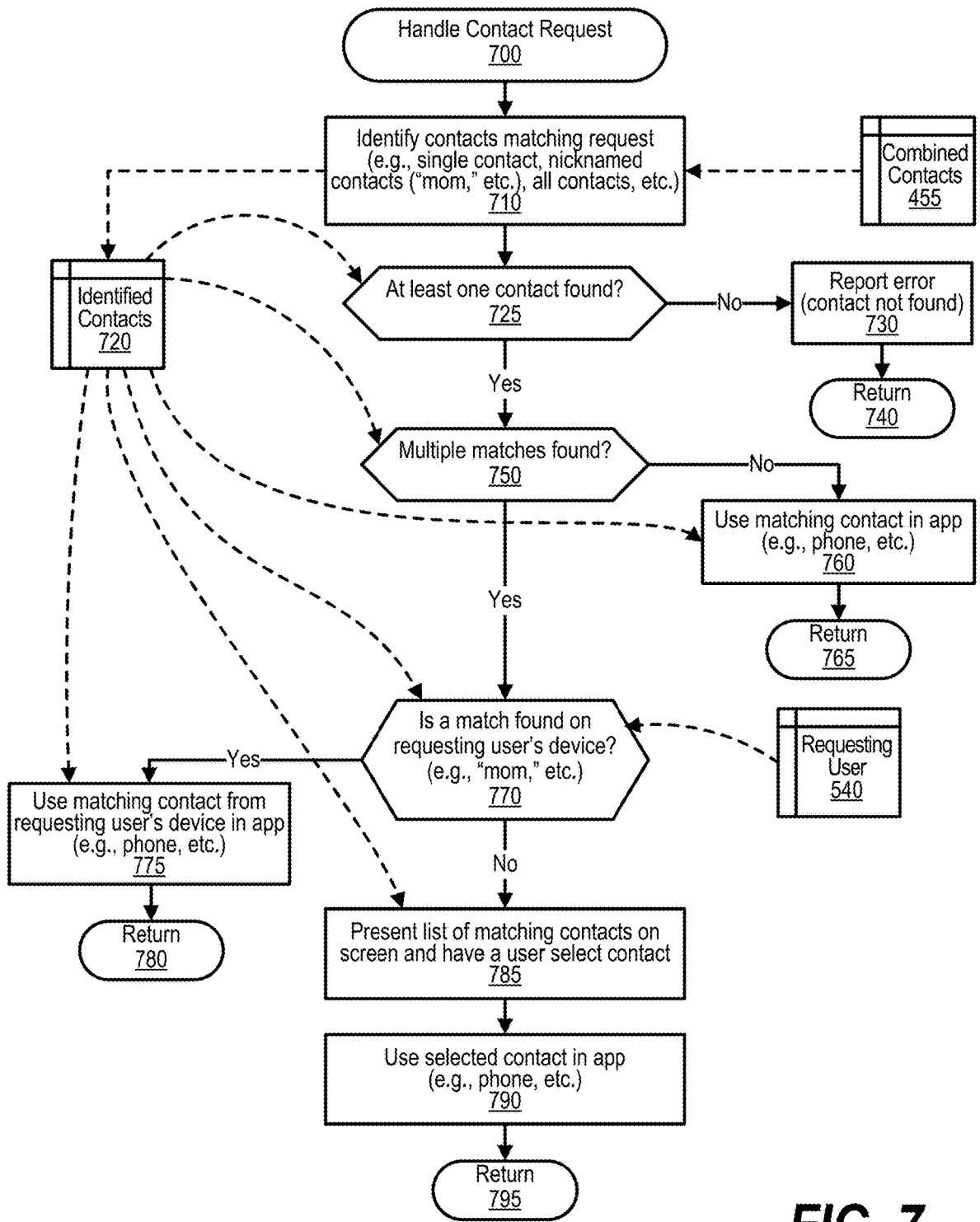
FIG. 7 is a flowchart showing steps taken by a process that shows handling of a contact request received at a console that is managing multiple concurrent Bluetooth connected devices.

FIG. 7 is a flowchart showing steps taken by a process that shows handling of a contact request received at a console that is managing multiple concurrent Bluetooth connected devices. FIG. 7 processing commences at 700 and shows the steps taken by a process that handles a contact, or telephone, request received at the system. At step 710, the process identifies all of the available contacts that match the criteria in the request with available contacts being retrieved from memory area 455. The telephone request might be for a single person (e.g., "call John Smith," etc.), or a call to a nickname (e.g., "call mom," etc.), or request for a list of contacts (e.g., "directory of service stations," etc.). The list of matching contacts are stored in memory area 720.

The process determines as to whether at least one contact was found matching the criteria included in the request (decision 725). If at least one contact was found matching the criteria included in the request, then decision 725 branches to the 'yes' branch for further processing. On the other hand, if no contacts were found matching the criteria included in the request, then decision 725 branches to the 'no' branch whereupon, at step 730, the process reports an error to the users indicating that no contacts were found and processing thereafter returns to the calling routine (see FIG. 5) at 740.

If at least one contact was found matching the request, then the process next determines whether multiple matches were found (decision 750). If multiple matches were found, then decision 750 branches to the 'yes' branch for further processing. On the other hand, if only a single match was found, then decision 750 branches to the 'no' branch whereupon, at step 760, the process uses the single matching contact in the app (e.g., telephone phone, etc.) to call the contact and processing thereafter returns to the calling routine (see FIG. 5) at 765.

When multiple matches are found, then steps 770 through 795 are performed to select one of the matches to use for the telephone call. First, the process determines whether one of the matches was found on the requesting user's device (decision 770). If one of the matches was found on the requesting user's device, then decision 770 branches to the 'yes' branch whereupon, at. step 775, the process uses the matching contact from the requesting user's device in the calling app (e.g., phone app, etc.) to call the contact and processing returns to the calling routine (see FIG. 5) at 780.

On the other hand, if no match is found on the requesting user's device, then decision 770 branches to the 'no' branch to perform steps 785 through 795. At step 785, the process presents a list of matching contacts either audibly or on the media console's screen and requests that a user select the contact that the user wishes to call. At step 790, the process receives the selection from the user and uses the selected contact in the calling app (e.g., phone app, etc.) to call the contact. FIG. 7 processing thereafter returns to the calling routine (see FIG. 5) at 795.

Figure 8:
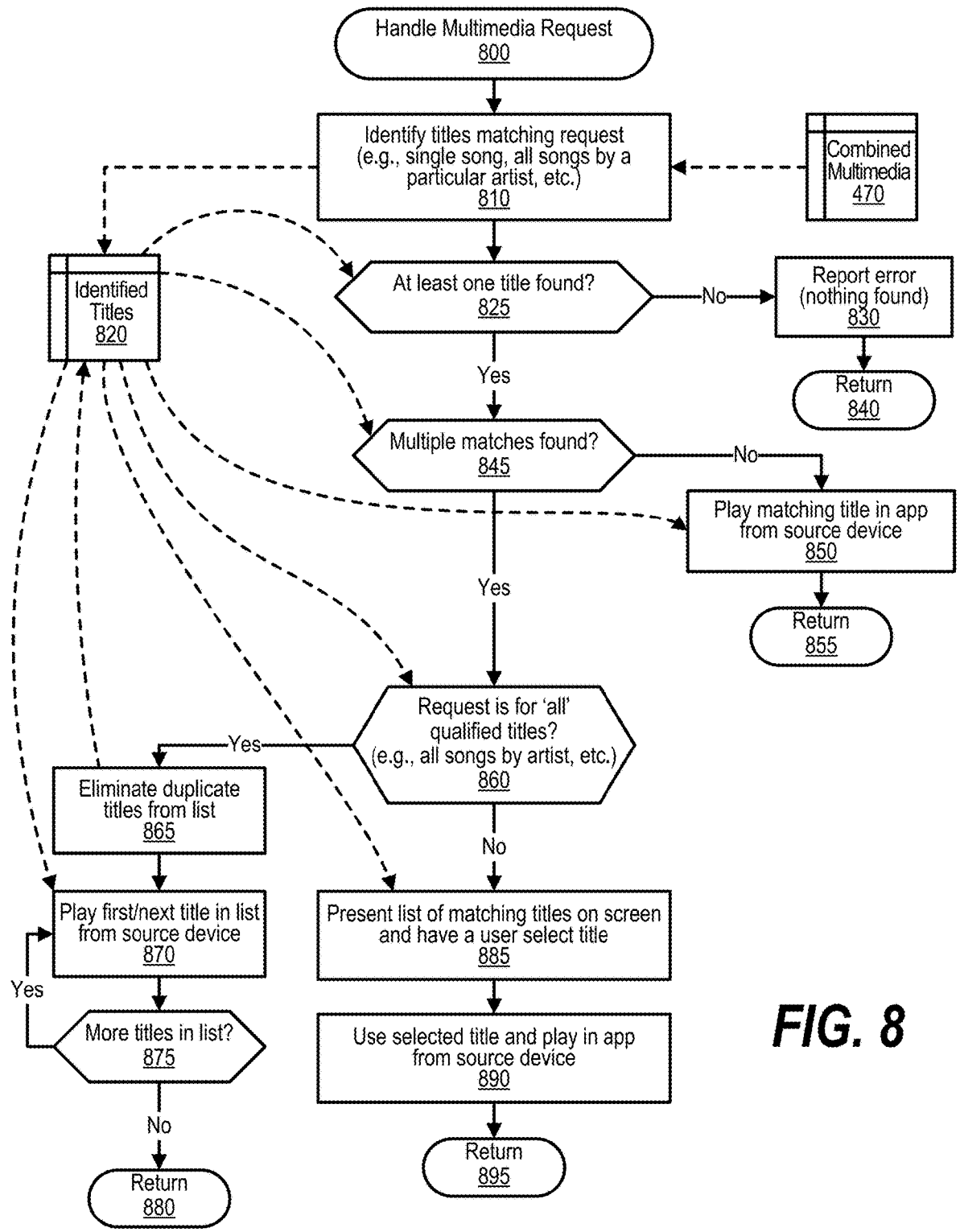
FIG. 8 is a flowchart showing steps taken by a process that shows handling of a multimedia request received at a console that is managing multiple concurrent Bluetooth connected devices.

FIG. 8 is a flowchart showing steps taken by a process that shows handling of a multimedia request received at a console that is managing multiple concurrent Bluetooth connected devices. FIG. 8 processing commences at 800 and shows the steps taken by a process that handles a multimedia request received from one of the users. At step 810, the process identifies all titles matching the request, such as a single song title, all songs by a particular artist, all songs of a particular type, etc. The available content (song titles, etc.) are retrieved from memory area 470 and the content matching the request is stored in memory area 820.

The process determines whether at least one content (title, etc.) was found matching the request (decision 825). If at least one title was found, then decision 825 branches to the 'yes' branch for further processing. On the other hand, if no matching titles were found, then decision 825 branches to the 'no' branch whereupon, at step 830, the process reports an error indicating that no matching titles were found and processing returns to the calling routine (see FIG. 5) at 840.

If at least one matching title was found then the process next determines whether multiple matches were identified or if only a single match was identified (decision 845). If multiple matches were identified, then decision 845 branches to the 'yes' branch for further processing. On the other hand, if a single match was identified, then decision 845 branches to the 'no' branch whereupon, at step 850, the process plays the matching title in the media player (e.g., on the console, etc.) with the content being retrieved from the source device where it is located and then processing returns to the calling routine (see FIG. 5) at 855.

When multiple have been identified, then the process determines whether the request is to play 'all' of the titles matching the request, such as all of the titles by a particular artist or if the request was for a single song or title (decision 860). If request is for 'all' matching titles, then decision 860 branches to the 'yes' branch to perform steps 865 through 880. On the other hand, if the request is for a single title, then decision 860 branches to the 'no' branch to perform steps 885 through 895.

When multiple titles are requested, then steps 865 through 880 are performed. At step 865, the process eliminates any duplicate titles from list stored in memory area 820 as the same title by the same artist might be stored on multiple devices. At step 870, the process plays the first title in list from the source device where it is stored. The process determines whether there are more titles in the list stored in memory area 820 (decision 875). If there are more titles in the list yet to play, then decision 875 branches to the 'yes' branch which loops back to step 870 to select and play the next title from the list. This looping continues until all songs or titles in the list have been played, at which point decision 875 branches to the 'no' branch exiting the loop and processing returns to the calling routine (see FIG. 5) at 880.

When a single title has been requested, then steps 885 through 895 are performed. At step 885, the process presents a list of the matching titles either audibly or on a screen accessible from the media console and prompts a user to select the desired title from the list. At step 890, the process retrieves a user's selection from the list and plays the selected title in the multimedia console through the vehicle's speakers with the content being retrieved from the source device where the selected title is stored. FIG. 8 processing thereafter returns to the calling routine (see FIG. 5) at 895.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a Bluetooth interface that connects the information handling system to a plurality of devices, the method comprising:

retrieving, at the information handling system a plurality of multimedia content identifiers from the plurality of devices, wherein one or more users are associated with each of the devices, and where the retrieved multimedia content identifiers are provided to a selected one of the users;

receiving, at the information handling system, a request from the selected user, wherein the request corresponds to a selected one of the multimedia content identifiers;

retrieving a selected multimedia content corresponding to the selected multimedia identifier, wherein the selected multimedia content is retrieved from a selected one of the devices where the selected multimedia content is stored; and fulfilling the request by playing the selected multimedia content on a audio output device accessible from the information handling system.

2. The method of claim 1 wherein the request is an app request, and wherein the method further comprises:

selecting an app from a selected one of the devices, wherein the app is found on one or more of the devices, and wherein the selected app corresponds to the app request; and executing the selected app.

3. The method of claim 1 wherein the request is a multimedia request, and wherein the method further comprises:

selecting a multimedia content from a selected one of the devices, wherein the selected multimedia content is found on one or more of the devices, and wherein the selected multimedia content corresponds to the multimedia request; and playing the selected multimedia content on a audio output device accessible from the information handling system.

4. The method of claim 1 wherein the request is a telephone call request, and wherein the method further comprises:

selecting, based on the request, a contact from a selected one of the devices, wherein the selected contact on one or more of the devices, and wherein the selected contact corresponds to the phone directory request; and initiating, from the information handling system, a telephone call from the selected device to the selected contact, wherein an audio output of the telephone call is played on a speaker accessible from the information handling system, and wherein an audio input of the telephone call is received on a microphone accessible from the information handling system.

5. The method of claim 1 wherein the request is a telephone call request, and wherein the method further comprises:

retrieving a plurality of contact identifiers from a plurality of the devices, wherein each of the contact identifiers matches the telephone call request;

in response to determining that at least one of the contact identifiers is stored on one the devices that is associated with the selected user, selecting the contact identifier from the device associated with the selected user;

in response to determining that none of the retrieved contact identifiers are stored on one the devices that is associated with the selected user:

providing the retrieved contact identifiers to at least one of the users; and receiving a selection from one of the users, wherein the selection corresponds to a selected one of the contact identifiers; and initiating, from the information handling system, a telephone call from a selected one of the devices to the selected contact identifier, wherein an audio output of the telephone call is played on a speaker accessible from the information handling system, and wherein an audio input of the telephone call is received on a microphone accessible from the information handling system.

6. The method of claim 1 wherein the request is a voice input request, and wherein the method further comprises:

identifying the selected user based on a set of vocal characteristics of the voice input request, wherein the identified devices are associated with the identified selected user.

7. An information handling system comprising:

one or more processors;

a memory coupled to at least one of the processors;

a Bluetooth interface that connects the information handling system to a plurality of devices; and a set of computer program instructions stored in the memory and executed by at least one of the processors in order to perform actions comprising:

retrieving, at the information handling system a plurality of multimedia content identifiers from the plurality of devices, wherein one or more users are associated with each of the devices, and where the retrieved multimedia content identifiers are provided to a selected one of the users;

receiving, at the information handling system, a request from the selected user, wherein the request corresponds to a selected one of the multimedia content identifiers;

retrieving a selected multimedia content corresponding to the selected multimedia identifier, wherein the selected multimedia content is retrieved from a selected one of the devices where the selected multimedia content is stored; and fulfilling the request by playing the selected multimedia content on a audio output device accessible from the information handling system.

8. The information handling system of claim 7 wherein the request is an app request, and wherein the actions further comprise:

selecting an app from a selected one of the devices, wherein the app is found on one or more of the devices, and wherein the selected app corresponds to the app request; and executing the selected app.

9. The information handling system of claim 7 wherein the request is a multimedia request, and wherein the actions further comprise:

selecting a multimedia content from a selected one of the devices, wherein the selected multimedia content is found on one or more of the devices, and wherein the selected multimedia content corresponds to the multimedia request; and playing the selected multimedia content on a audio output device accessible from the information handling system.

10. The information handling system of claim 7 wherein the request is a telephone call request, and wherein the actions further comprise:
   selecting, based on the request, a contact from a selected one of the devices, wherein the selected contact on one or more of the devices, and wherein the selected contact corresponds to the phone directory request; and
   initiating, from the information handling system, a telephone call from the selected device to the selected contact, wherein an audio output of the telephone call is played on a speaker accessible from the information handling system, and wherein an audio input of the telephone call is received on a microphone accessible from the information handling system.

11. The information handling system of claim 7 wherein the request is a telephone call request, and wherein the actions further comprise:
   retrieving a plurality of contact identifiers from a plurality of the devices, wherein each of the contact identifiers matches the telephone call request;
   in response to determining that at least one of the contact identifiers is stored on one the devices that is associated with the selected user, selecting the contact identifier from the device associated with the selected user;
   in response to determining that none of the retrieved contact identifiers are stored on one the devices that is associated with the selected user:
      providing the retrieved contact identifiers to at least one of the users; and
      receiving a selection from one of the users, wherein the selection corresponds to a selected one of the contact identifiers; and
   initiating, from the information handling system, a telephone call from a selected one of the devices to the selected contact identifier, wherein an audio output of the telephone call is played on a speaker accessible from the information handling system, and wherein an audio input of the telephone call is received on a microphone accessible from the information handling system.

12. The information handling system of claim 7 wherein the request is a voice input request, and wherein the actions further comprise:
   identifying the selected user based on a set of vocal characteristics of the voice input request, wherein the identified devices are associated with the identified selected user.

13. A computer program product comprising:
   a computer readable storage medium, comprising computer program code that, when executed by an information handling system, executes actions comprising:
      retrieving, through a Bluetooth interface to the information handling system a plurality of multimedia content identifiers from a plurality of devices, wherein one or more users are associated with each of the devices, and where the retrieved multimedia content identifiers are provided to a selected one of the users;
      receiving, at the information handling system, a request from the selected user, wherein the request corresponds to a selected one of the multimedia content identifiers;
      retrieving a selected multimedia content corresponding to the selected multimedia identifier, wherein the selected multimedia content is retrieved from a selected one of the devices where the selected multimedia content is stored; and
      fulfilling the request by playing the selected multimedia content on a audio output device accessible from the information handling system.

14. The computer program product of claim 13 wherein the request is an app request, and wherein the actions further comprise:
   selecting an app from a selected one of the devices, wherein the app is found on one or more of the devices, and wherein the selected app corresponds to the app request; and
   executing the selected app.

15. The computer program product of claim 13 wherein the request is a multimedia request, and wherein the actions further comprise:
   selecting a multimedia content from a selected one of the devices, wherein the selected multimedia content is found on one or more of the devices, and wherein the selected multimedia content corresponds to the multimedia request; and
   playing the selected multimedia content on a audio output device accessible from the information handling system.

16. The computer program product of claim 13 wherein the request is a telephone call request, and wherein the actions further comprise:
   selecting, based on the request, a contact from a selected one of the devices, wherein the selected contact on one or more of the devices, and wherein the selected contact corresponds to the phone directory request; and
   initiating, from the information handling system, a telephone call from the selected device to the selected contact, wherein an audio output of the telephone call is played on a speaker accessible from the information handling system, and wherein an audio input of the telephone call is received on a microphone accessible from the information handling system.

17. The computer program product of claim 13 wherein the request is a telephone call request, and wherein the actions further comprise:
   retrieving a plurality of contact identifiers from a plurality of the devices, wherein each of the contact identifiers matches the telephone call request;
   in response to determining that at least one of the contact identifiers is stored on one the devices that is associated with the selected user, selecting the contact identifier from the device associated with the selected user;
   in response to determining that none of the retrieved contact identifiers are stored on one the devices that is associated with the selected user:
      providing the retrieved contact identifiers to at least one of the users; and
      receiving a selection from one of the users, wherein the selection corresponds to a selected one of the contact identifiers; and
   initiating, from the information handling system, a telephone call from a selected one of the devices to the selected contact identifier, wherein an audio output of the telephone call is played on a speaker accessible from the information handling system, and wherein an audio input of the telephone call is received on a microphone accessible from the information handling system.

* * * * *